United States Patent [19]

Ueda

[11] Patent Number: 5,556,570
[45] Date of Patent: Sep. 17, 1996

[54] CARBONACEOUS FERROMAGNETICS AND METHOD FOR THE PREPARATION THEREOF

[75] Inventor: Hisashi Ueda, Tsukuba, Japan

[73] Assignee: Japan as represented by Director General of Agency of Industrial Science and Technology, Japan

[21] Appl. No.: 307,055

[22] Filed: Sep. 16, 1994

[30] Foreign Application Priority Data

Sep. 27, 1993 [JP] Japan .................................. 5-262969

[51] Int. Cl.⁶ .............................. C01B 31/02; H01F 1/42
[52] U.S. Cl. .............................. 252/62.51 R; 423/445 R
[58] Field of Search ............... 252/62.51 R; 423/445 R

[56] References Cited

U.S. PATENT DOCUMENTS 4,263,268  4/1981  Knox et al. ........................ 423/445 R
4,832,881  5/1989  Arnold, Jr. et al. ................ 423/445 R Primary Examiner—Melissa Bonner
Attorney, Agent, or Firm—Wenderoth, Lind & Ponack

[57] ABSTRACT

The invention provides a carbonaceous ferromagnetic material consisting substantially of carbon alone as prepared by the carbonization of a specific aromatic compound, such as phenazine and indigo, to such an extent that the hydrogen atoms in the starting aromatic compound are eliminated as completely as possible but graphitization of the carbonization product does not take place by conducting the carbonization treatment at a temperature not exceeding 800° C. The carbonization reaction can be promoted by admixing the aromatic compound with a compound of a ferromagnetic metallic element such as cobalt chloride, which is removed from the carbonization product by dissolving away with hydrochloric acid and ammonia water. Elimination of hydrogen atoms from the aromatic compound can be more complete by conducting the heat treatment for the carbonization in an atmosphere containing a halogen-generating agent such as carbon tetrachloride.

8 Claims, No Drawings

5,556,570

CARBONACEOUS FERROMAGNETICS AND METHOD FOR THE PREPARATION THEREOF

BACKGROUND OF THE INVENTION

The present invention relates to a carbonaceous ferromagnetic material and a method for the preparation thereof. More particularly, the invention relates to a ferromagnetic material consisting substantially of carbon alone without containing any metallic or, in particular, transition metal elements as well as a method for the preparation thereof.

As is well known, conventional ferromagnetic materials are formed from a metal, alloy or oxide of certain ferromagnetic transition metal elements such as iron, cobalt, nickel and the like. These ferromagnetic materials advantageously have a large magnetic susceptibility as well as large coercive force and residual magnetization. Along with these advantageous properties, however, these conventional ferromagnetic materials have several disadvantages and problems. For example, (1) these ferromagnetic materials usually have a large specific gravity because the principal ingredients in the ferromagnetic material are heavy metal elements so that the application thereof is limited not to be suitable for mounting, for example, on spacecrafts, (2) the natural resources of the transition metals, excepting iron, are limited in the geological occurrence so that exhaustion of the resources will be a serious future problem, (3) as an inherent property in metallic and ceramic materials, these ferromagnetic materials have high hardness and rigidity to cause some problems and difficulties in the mechanical working thereof as compared with soft or flexible materials, (4) a large energy is required for the demagnetization of these ferromagnetic materials in a magnetized state so that, when they are to be discarded as a waste material, an economical problem must be taken into consideration because ferromagnetic materials discarded before demagnetization sometimes cause a serious environmental problem, (5) some of the heavy metal constituents in these ferromagnetic materials have toxicity against and low adaptability to living bodies so that their application to living bodies is limited in this regard, and so on.

SUMMARY OF THE INVENTION

The present invention accordingly has an object to provide a novel ferromagnetic material free from the above described problems and disadvantages in the conventional transition metal-based ferromagnetic materials. Namely, the present invention has been completed with an object to provide a novel ferromagnetic material which has a small specific gravity as compared with conventional transition metal-based ferromagnetics, which has no problem in the available quantity of natural resources for the starting material without the problem of future exhaustion, which is constituted from non-metallic elements alone, of which waste materials can be easily disposed without any environmental problems, for example, by incineration consuming no large electric energy for demagnetization, which has good adaptability to living bodies without toxicity and so on. Directing his attention to carbon as a promising base material which could provide such a novel and advantageous ferromagnetic material, the inventor has conducted extensive investigations to obtain a carbonaceous ferromagnetic material having excellent ferromagnetic properties leading to completion of the present invention.

The carbonaceous ferromagnetic material provided by the present invention consists substantially of carbon alone and is characterized in that σ-unpaired electrons are left therein in an unbonded state.

Such a carbonaceous ferromagnetic material can be prepared by a method which comprises the steps (a) dissolving or dispersing an aromatic ring compound having, in a mole-cule, at least two atoms or groups selected from the group consisting of hereto atoms and carbonyl groups, the carbon atom of the carbonyl group being a member of the ring structure of the aromatic ring compound, and a compound of a ferromagnetic metallic element in a solvent capable of at least partly dissolving the aromatic ring compound and the compound of the ferromagnetic metallic element to prepare a blend or solution;

(b) removing the solvent from the blend or solution to give a dry blend of the aromatic ring compound and the ferromagnetic metal compound;

(c) subjecting the solid blend obtained in step (b) to thermal decomposition of the aromatic compound by heating at a temperature not exceeding 800° C. to effect carbonization of the aromatic ring compound into a carbonization product; and, preferably;

(d) removing the ferromagnetic metal compound from the carbonization product by dissolving away with hydrochloric acid and ammonia water.

DETAILED DESCRIPTION OF THE PREFERRED EMBODIMENTS

As is described above, the carbonaceous ferromagnetic material of the invention is prepared by the thermal decomposition of a blend of a specific aromatic ring compound and a specific ferromagnetic metal compound to effect carbonization of the aromatic compound to such an extent that the aromatic compound is converted substantially completely into ungraphitized carbon followed, preferably, by the removal of the ferromagnetic metallic ingredient by dissolving away with hydrochloric acid and ammonia water.

It is important in the above described procedure of carbonization for the preparation of the carbonaceous ferromagnetic material that the hydrogen atoms as the constituent of the starting aromatic ring compound are eliminated as completely as possible in the thermal decomposition reaction which, however, should not cause graphitization of the carbonized material. The very discovery obtained by the inventor leading to the present invention is that a carbonaceous material prepared by the carbonization of an aromatic ring compound can be imparted with ferromagnetic properties only when these requirements are satisfied.

When an organic compound is subjected to thermal decomposition reaction to effect carbonization, the carbonization product thus obtained usually contains a small amount of hydrogen atoms. It is an unexpected novel discovery that these residual hydrogen atoms in a conventional carbonization product of an aromatic compound are responsible for the non-ferromagnetic properties of such a carbonization product. When the carbonization reaction of an aromatic compound is performed in the presence of a halogen or a halogen-generating agent such as carbon tetrachloride, elimination of the hydrogen atoms in the aromatic compound can be so complete that the carbonization product obtained thereby contains substantially no hydrogen atoms as a consequence of the reaction of the hydrogen atoms in the starting aromatic compound with halogen because hydrogen atoms are stabilized with higher stability when combined with halogen atoms than with carbon atoms. By conducting the thermal decomposition of the aromatic ring compound according to the invention, the hydrogen atoms in the starting aromatic compound can be completely eliminated still without graphitization of the carbonization product to give a carbonaceous material having $sp^2$-$\sigma$ unpaired electrons to exhibit ferromagnetic properties.

Some of organic compounds, when heated, are vaporized or sublimated before the compound is carbonized. Carbonization of such a vaporizable or sublimatable organic compound can be performed by heating a porous carrier, such as silica gel, supporting the organic compound by adsorption. An alternative way is that the organic compound is coordinated to certain metallic elements such as cobalt and nickel to form a chelate in which several molecules of the organic compound are connected together so as to prevent vaporization or sublimation of the compound. A still alternative method is to effect thermal polymerization of the compound to form a polymer which is not vaporizable or sublimatable. Addition of a salt of cobalt, nickel and the like to an aromatic ring compound to be subjected to carbonization according to the inventive method has an effect to catalytically promote the reaction to form ferromagnetic carbonization product along with the effect to suppress vaporization or sublimation of the aromatic compound by forming a chelate.

The starting material for the preparation of the inventive carbonaceous ferromagnetic material is an aromatic ring compound, which is preferably a condensed-ring aromatic compound, having, in a molecule, at least two atoms or groups selected from the group consisting of hetero atoms and carbonyl groups, the carbon atom in the carbonyl group being a member of the ring structure of the aromatic compound. The hetero atom here implied includes atoms of oxygen, sulfur and nitrogen. Examples of such an aromatic ring compound include flavone, 1,10-phenanthroline, phenazine, phenoxazine, phenothiazine, tetrazole, indigo and the like either alone or in combination of two kinds or more according to need, though not particularly limitative thereto. A limiting factor in the selection of the aromatic ring compound is the solubility of the compound in a solvent in which the ferromagnetic metal compound must also be soluble at least partly. In this regard, certain aromatic ring compounds such as violanthrone are less preferable because of the poor solubility behavior of the compound in most of conventional solvents.

Examples of the ferromagnetic metal compounds or salts include iron (III) chloride, cobalt chloride, nickel chloride, cobalt acetate, cobalt nitrate, iron (II) nitrate, nickel nitrate and the like either alone or in combination of two kinds or more according to need. It is a requirement that the ferromagnetic metal compound is soluble in a solvent in which the aromatic ring compound is also soluble at least partly. The above mentioned ferromagnetic metal salts can be used in the form of their hydrated salts such as $CoCl_2 \cdot 6H_2O$, $NiCl_2 \cdot 6H_2O$, $Co(OCOCH_3)_2 \cdot 4H_2O$, $Co(NO_3)_2 \cdot 6H_2O$, $Fe(NO_3)_2 \cdot 9H_2O$ and $Ni(NO_3)_2 \cdot 6H_2O$.

In step (a) of the inventive method, the above described aromatic ring compound and the ferromagnetic metal compound are dissolved together in a solvent to prepare a blend or solution. The solvent is not particularly limitative and any solvents can be used provided that both of the aromatic ring compound and the ferromagnetic metal compound are soluble therein at least partly. For example, ethyl alcohol can be used satisfactorily in most cases. The amount of the ferromagnetic metal compound is at least 1% by weight based on the aromatic ring compound. Water can also be used as the solvent when the aromatic compound has solubility in water as is the case with indigo as the aromatic compound which is, though slightly, soluble in water. From the standpoint of imparting ferromagnetic properties to the carbonization product, it is preferable to use a relatively large amount of the ferromagnetic metal compound but an excessively large amount of the ferromagnetic metal compound causes a problem and difficulty in the subsequent step (d) to remove the metallic ingredient from the carbonization product by dissolving away with hydrochloric acid and ammonia water. In this regard, the amount of the ferromagnetic metal compound is selected in the range from 1% to 10% by weight based on the amount of the aromatic ring compound. The amount of the solvent is of course not limitative but should be as small as possible provided that a uniform blend or solution of the aromatic compound and the ferromagnetic metal salt can be prepared.

It is sometimes advantageous that the solution of the aromatic ring compound and the ferromagnetic metal compound is admixed with a finely divided inorganic porous material such as a silica gel powder in an amount of up to 10 times by weight of the aromatic compound in order to suppress vaporization or sublimation of the aromatic compound. The silica gel powder added to the solution of the aromatic compound and the ferromagnetic metal compound naturally remains as such in the carbonization product obtained by the thermal decomposition of the aromatic compound as a blend with the ferromagnetic metal compound and silica gel powder. Although such a carbonization product containing a silica gel powder can be used as such as a ferromagnetic material, it is preferable to remove the silica gel powder by dissolving away with an aqueous solution of potassium hydroxide.

In step (b) of the inventive method, the organic solvent in the above prepared solution is removed by evaporation, if necessary, under reduced pressure to give a dry blend of the aromatic compound and the ferromagnetic metal compound, which is, in step (c) of the inventive method, subjected to a carbonization treatment of the aromatic compound by heating at a temperature not exceeding 800° C. to give a still ungraphitized carbonization product containing substantially no residual hydrogen atoms. This thermal decomposition treatment is carried out in a non-oxidizing atmosphere or, preferably, in vacuum. It is preferable that the thermal decomposition treatment in step (c) of the inventive method is carried out in the presence of a small amount of a halogen or a halogen-generating agent such as carbon tetrachloride contained in the atmosphere in order to promote elimination of the hydrogen atoms bonded to the carbon atoms in the starting aromatic compound. The length of time taken for complete carbonization of the aromatic compound naturally depends on various factors including the temperature. For example, the carbonization of the aromatic compound is complete at 650° C. by a heating treatment for about 3 hours.

The carbonization product obtained in step (c) of the inventive method, which may contain a silica gel powder, if added, of course exhibits ferromagnetic properties but it is usually advantageous to remove the metallic ingredients therefrom. Namely, the carbonization product, if necessary, after removal of the silica gel powder is subjected to a treatment with hydrochloric acid and ammonia water in order to dissolve away the metallic ingredients as completely as possible. Although concentrated hydrochloric acid and concentrated ammonia water should be used as such in this dissolving treatment in order to obtain the highest efficiency of the treatment, the efficiency of the dissolving treatment is practically satisfactory by using a diluted aqueous solutions of hydrochloric acid and ammonia water obtained by diluting concentrated hydrochloric acid or concentrated ammonia water, respectively, by the addition of an equal volume of water. The carbonization product after step (d) of the inventive method is washed with water and dried to give a carbonaceous ferromagnetic material of the invention.

In the following, examples are given to illustrate the method of the invention for the preparation of a carbonaceous ferromagnetic material as well as the ferromagnetic properties of the thus obtained carbonaceous ferromagnetic materials in more detail.

EXAMPLE 1

A uniform solution was prepared by dissolving 1.0 g of phenazine and 0.5 g of cobalt chloride hexahydrate $CoCl_2 \cdot 6H_2O$ in 20 ml of ethyl alcohol and the solution was subjected to evaporation of the solvent to give a uniform blend of phenazine and cobalt chloride, which was then admixed with 1.0 g of a silica gel powder having an average particle diameter of 250 μm. The blend was taken in a porcelain boat and heated in an atmosphere of nitrogen first at 300° C. for 60 minutes and then at 500° C. for another 60 minutes. The blend after this preliminary heat treatment was transferred into another porcelain boat and subjected to a carbonization treatment by heating first at 550° C. for 200 minutes in an atmosphere of carbon tetrachloride vapor under a pressure of 0.1 Torr and then at 650° C. for another 200 minutes in vacuum under a pressure of 0.0001 Torr to give a carbonization product of phenazine containing the metallic ingredient of cobalt and admixed with the silica gel powder.

The thus obtained carbonization product was added to 30 ml of a 10% by weight aqueous solution of potassium hydroxide and kept therein at 70° C. for 20 hours so as to dissolve away the silica gel powder. After washing with water to remove potassium hydroxide and drying, the carbonization product was added to 10 ml of a 6N hydrochloric acid and kept therein at 70° C. for 20 hours to dissolve away the metallic ingredient of cobalt followed by washing with water and drying. Thereafter, the carbonization product was added to 10 ml of a diluted ammonia water prepared by diluting a concentrated ammonia water with an equal volume of water and kept at 70° C. for 20 hours to dissolve away any chloride contained therein followed by washing with water and drying. The thus obtained purified and dried carbonization product contained 99.5% by weight of carbon, 0.1% by weight of cobalt and 0.3% by weight of silica, the balance being unidentified impurities.

A 1.0 mg portion of this carbonization product was taken in a glass capillary tube of 1.5 mm outer diameter and sealed therein under vacuum to give a sample specimen for the measurement of the magnetic susceptibility. The results of the measurement were that the residual magnetization was 0.180 emu/g and the coercive force was 28.6 mT.

EXAMPLE 2

A pasty blend was prepared by uniformly kneading 0.3 g of indigo, 0.27 g of cobalt chloride hexahydrate and 2.0 g of a silica gel powder having an average particle diameter of 250 μm with addition of 1 ml of water. After air drying, the blend was heated in an atmosphere of nitrogen at 400° C. for 60 minutes so as to be freed from any volatile ingredients and matters decomposable at this temperature. Thereafter, the temperature was increased to 650° C. and the blend was heated at this temperature for 200 minutes to be thermally decomposed. The thus preliminarily carbonized blend was then heated at 550° C. for 180 minutes in an atmosphere of carbon tetrachloride vapor under a pressure of 0.1 Torr to effect elimination of hydrogen atoms and further subjected to a heat treatment at 650° C. for 360 minutes in vacuum of 0.0001 Torr pressure to completely remove any volatile materials.

The thus obtained carbonization product was immersed in a 20% aqueous solution of potassium hydroxide at 70° C. for 20 hours to dissolve away the silica gel powder followed by washing with water and drying. The dried carbonization product was immersed in 10 ml of 6N hydrochloric acid at 70° C. for 20 hours to remove the metallic ingredient of cobalt followed by washing with water and drying. The acid-treated carbonization product was further immersed in 10 ml of a diluted ammonia water, which was prepared by diluting concentrated ammonia water with an equal volume of water, at 70° C. for 20 hours to remove the chloride impurities. This purification treatment with diluted hydrochloric acid and diluted ammonia water was repeated three times. The thus obtained purified and dried carbonization product contained 99.1% by weight of carbon, 0.5% by weight of cobalt and 0.3% by weight of silica, the balance being unidentified impurities.

A 1.0 mg portion of this carbonization product was taken in a glass capillary tube of 1.5 mm outer diameter and sealed therein under vacuum to give a sample specimen for the measurement of the magnetic susceptibility. The results of the measurement were that the 1000 G magnetization was 1.44 emu/g, the residual magnetization was 0.721 emu/g and the coercive force was 53.3 mT. It could be concluded from the following comparison that these magnetic properties were the attribute of the carbonization product of indigo per se and the 0.5% by weight of cobalt as an impurity contained therein had relatively small contribution to the magnetic properties. Namely, the 1000 G magnetization and residual magnetization of metallic cobalt are 87 emu/g and 8.07 emu/g, respectively, so that the contribution of 0.5% cobalt to these values can be estimated as 87×0.005 or 0.435 emu/g and 8.07×0.005 or 0.044 emu/g, respectively. Further, a comparative carbonaceous material containing 0.5% by weight of cobalt was prepared by impregnating an active carbon with a cobalt salt followed by reduction of the cobalt salt with hydrogen at 350° C. for 1 hour. The values of 1000 G magnetization and residual magnetization of this comparative cobalt-containing active carbon were 0.232 emu/g and 0.0236 emu/g, respectively, to be much lower than the corresponding values of the carbonization product of indigo prepared in this example. Incidentally, the above mentioned coercive force 53.3 mT is much larger than the values of 7.45 mT for metallic cobalt and 1.84 mT for the above prepared comparative cobalt-containing active carbon.

COMPARATIVE EXAMPLE

A 1.00 g portion of violanthrone was heated in an atmosphere of nitrogen at 350° C. for 60 minutes to be freed from volatile matters and the decomposition product formed at this temperature. The thus pre-treated violanthrone was further heated at 350° C. for 100 minutes in an atmosphere of carbon tetrachloride vapor under a pressure of 0.1 Torr and then heated at 650° C. for 360 minutes in vacuum of 0.0001 Torr pressure to remove any vaporizable matters including chlorides and adsorbed chlorine. The thus obtained carbonization product of violanthrone was subjected to the measurement of the magnetic susceptibility to find a magnetization at 15 kG of 7.7 emu/g in air. This value of magnetization at 15 kG could be further increased to 23.1 emu/g in air when the carbonization product was subjected to a further heat treatment at 650° C. for 360 minutes in vacuum of 0.0001 Torr.

The above obtained carbonization product of violanthrone containing 99.1% by weight of carbon, the balance being unidentified impurities, was subjected to the measurement of the magnetic properties in vacuum in the same manner as in the preceding examples to give the results that the values of the residual magnetization and coercive force were 0.0296 emu/g and 5.38 mT, respectively. These results support the conclusion that, although a ferromagnetic carbonaceous material can be obtained by the carbonization of the specific aromatic compound even in the absence of a compound of a ferromagnetic metal such as cobalt as a catalyst, the length of time for the carbonization treatment conducted in high vacuum must be extended so long as to cause a disadvantage so that use of such a ferromagnetic metal compound is advantageous in order to obtain a ferromagnetic carbonaceous material of strong magnetic properties by a heat treatment for a short time.

What is claimed is:

1. A method for the preparation of a carbonaceous ferromagnetic material which comprises the steps of:
   (a) dissolving or dispersing an aromatic ring compound having at least two atoms or groups selected from the group consisting of hetero atoms and carbonyl groups, the carbon atom of the carbonyl group being a member of the ring structure in the aromatic compound, and a compound of a ferromagnetic metallic element in a solvent capable of at least partly dissolving the aromatic ring compound and the compound of a ferromagnetic metallic element to prepare a solution or blend;
   (b) removing the solvent from the solution or blend to give a dry blend of the aromatic ring compound and the ferromagnetic metal compound;
   (c) subjecting the dry blend obtained in step (b) to thermal decomposition of the aromatic ring compound by heating at a temperature not exceeding 800° C. in an atmosphere containing halogen or a halogen-generating agent to effect carbonization of the aromatic ring compound into a carbonization product; and then
   (d) removing the ferromagnetic metal compound from the carbonization product by dissolving away with hydrochloric acid and ammonia water.

2. The method for the preparation of a carbonaceous ferromagnetic material as claimed in claim 1 in which the thermal decomposition in step (c) is carried out in an atmosphere containing carbon tetrachloride.

3. The method for the preparation of a carbonaceous ferromagnetic material as claimed in claim 1 in which the dry blend obtained in step (b) is further blended with a silica gel powder.

4. The method for the preparation of a carbonaceous ferromagnetic material as claimed in claim 3 in which the silica gel powder contained in the carbonization product after step (c) is removed by dissolving away with an aqueous solution of potassium hydroxide.

5. The method for the preparation of a carbonaceous ferromagnetic material as claimed in claim 1 in which the amount of the compound of the ferromagnetic metallic element is in the range from 1% to 10% by weight based on the amount of the aromatic ring compound.

6. The method for the preparation of a carbonaceous ferromagnetic material as claimed in claim 1 in which the ferromagnetic metallic element is selected from the group consisting of iron, nickel and cobalt.

7. The method for the preparation of a carbonaceous ferromagnetic material as claimed in claim 1 in which the hetero atom in the aromatic ring compound is selected from the group consisting of oxygen, nitrogen and sulfur.

8. The method for the preparation of a carbonaceous ferromagnetic material as claimed in claim 7 in which the aromatic ring compound is selected from the group consisting of flavone, 1,10-phenanthroline, phenazine, phenothiazine, tetrazole and indigo.

* * * * *